US012572307B2

(12) United States Patent
Bert et al.

(10) Patent No.: US 12,572,307 B2
(45) Date of Patent: Mar. 10, 2026

(54) READ-AHEAD BASED ON READ SIZE AND QUEUE IDENTIFIER

(71) Applicant: Micron Technology, Inc., Boise, ID (US)

(72) Inventors: Luca Bert, San Jose, CA (US); Sampath Ratnam, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/770,951

(22) Filed: Jul. 12, 2024

(65) Prior Publication Data

US 2025/0021268 A1     Jan. 16, 2025

Related U.S. Application Data

(60) Provisional application No. 63/526,514, filed on Jul. 13, 2023.

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
CPC ..... G06F 3/0659; G06F 3/0611; G06F 3/0673
See application file for complete search history.

(56) References Cited

U.S. PATENT DOCUMENTS

| | | | |
|---|---|---|---|
| 10,901,624 B1 | 1/2021 | Benisty | |
| 11,385,836 B2 | 7/2022 | Steinmetz | |
| 2004/0128449 A1* | 7/2004 | Osborne | G06F 13/4243 |
| | | | 711/137 |
| 2019/0164615 A1 | 5/2019 | Kim | |
| 2020/0225883 A1* | 7/2020 | Bhimani | G06F 18/23 |
| 2020/0364163 A1* | 11/2020 | Schauer | G06F 13/4282 |
| 2020/0371942 A1* | 11/2020 | Anastasiev | G06F 12/0215 |
| 2021/0191626 A1 | 6/2021 | Ryu et al. | |
| 2021/0303206 A1 | 9/2021 | Saxena et al. | |

OTHER PUBLICATIONS

"International Application Serial No. PCT US2024 037923, International Search Report mailed Oct. 13, 2024", 3 pgs.
"International Application Serial No. PCT US2024 037923, Written Opinion mailed Oct. 23, 2024", 4 pgs.

* cited by examiner

*Primary Examiner* — Prasith Thammavong
(74) *Attorney, Agent, or Firm* — Schwegman Lundberg & Woessner, P.A.

(57)     ABSTRACT

Various embodiments provide for performing one or more data read-ahead operations on a memory system based on a read size and a queue identifier of a read request. In particular, a memory system of some embodiments is configured to perform at least one read-ahead operation when an individual read request, received from a host system in association with a queue identifier, has a read size equal to a maximum data transfer size (MDTS) of the memory system.

17 Claims, 6 Drawing Sheets

300

400

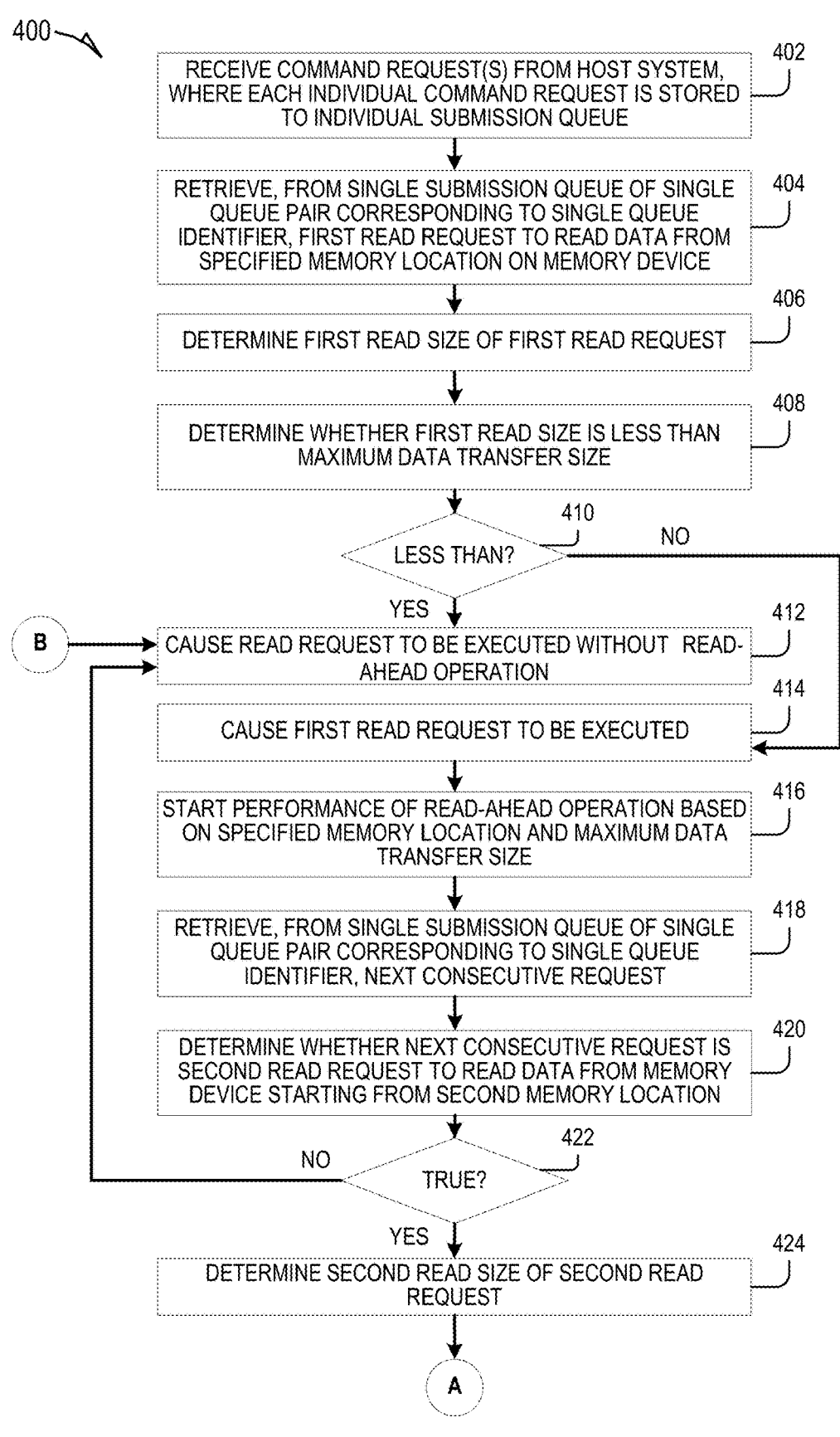

402
RECEIVE COMMAND REQUEST(S) FROM HOST SYSTEM, WHERE EACH INDIVIDUAL COMMAND REQUEST IS STORED TO INDIVIDUAL SUBMISSION QUEUE

404
RETRIEVE, FROM SINGLE SUBMISSION QUEUE OF SINGLE QUEUE PAIR CORRESPONDING TO SINGLE QUEUE IDENTIFIER, FIRST READ REQUEST TO READ DATA FROM SPECIFIED MEMORY LOCATION ON MEMORY DEVICE

406
DETERMINE FIRST READ SIZE OF FIRST READ REQUEST

408
DETERMINE WHETHER FIRST READ SIZE IS LESS THAN MAXIMUM DATA TRANSFER SIZE

410
LESS THAN?          NO

YES

B

412
CAUSE READ REQUEST TO BE EXECUTED WITHOUT READ-AHEAD OPERATION

414
CAUSE FIRST READ REQUEST TO BE EXECUTED

416
START PERFORMANCE OF READ-AHEAD OPERATION BASED ON SPECIFIED MEMORY LOCATION AND MAXIMUM DATA TRANSFER SIZE

418
RETRIEVE, FROM SINGLE SUBMISSION QUEUE OF SINGLE QUEUE PAIR CORRESPONDING TO SINGLE QUEUE IDENTIFIER, NEXT CONSECUTIVE REQUEST

420
DETERMINE WHETHER NEXT CONSECUTIVE REQUEST IS SECOND READ REQUEST TO READ DATA FROM MEMORY DEVICE STARTING FROM SECOND MEMORY LOCATION

422
NO          TRUE?

YES

424
DETERMINE SECOND READ SIZE OF SECOND READ REQUEST

READ-AHEAD BASED ON READ SIZE AND QUEUE IDENTIFIER

PRIORITY APPLICATION

This application claims the benefit of priority to U.S. Provisional Application Ser. No. 63/526,514, filed Jul. 13, 2023, which is incorporated herein by reference in its entirety.

TECHNICAL FIELD

Embodiments of the disclosure relate generally to memory devices and, more specifically, to performing one or more data read-ahead operations on a memory system (e.g., the memory sub-system) based on a read size and a queue identifier of a read request.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 3, 4A, and 4B are flow diagrams of example methods for performing one or more data read-ahead operations on a memory system, in accordance with some embodiments of the present disclosure.

DETAILED DESCRIPTION

Figure 1:
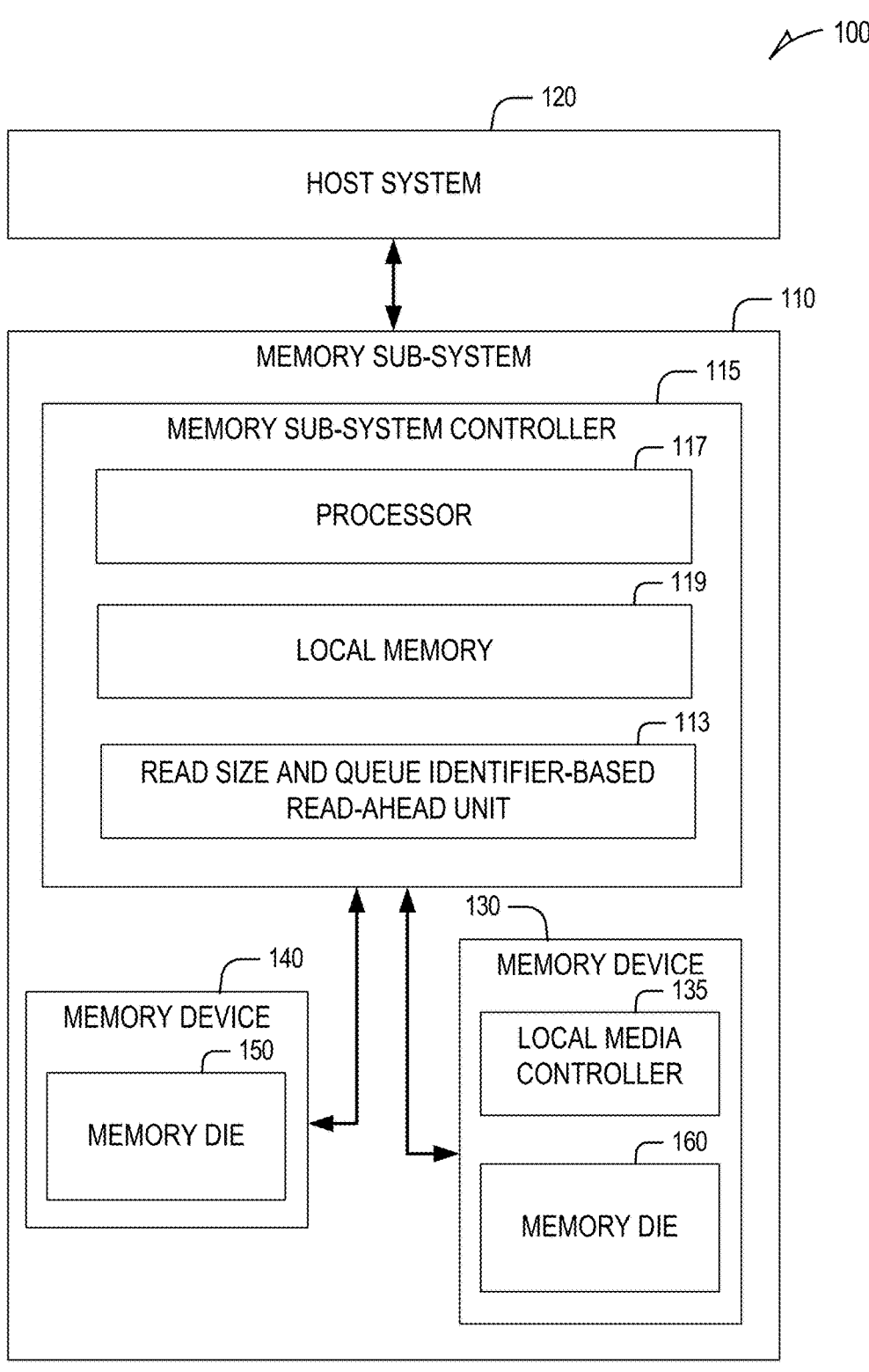
FIG. 1 is a block diagram illustrating an example computing system that includes a memory sub-system, in accordance with some embodiments of the present disclosure.

Aspects of the present disclosure are directed to performing one or more data read-ahead operations on a memory system (e.g., the memory sub-system) based on a read size and a queue identifier of a read request. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write commands, read commands) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request (e.g., data access request or command request), is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system can re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., NOT-AND (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

Certain memory devices, such as NAND-type memory devices, comprise one or more blocks, (e.g., multiple blocks), with each of those blocks comprising multiple memory cells. For instance, a memory device can comprise multiple pages (also referred as wordlines), with each page comprising a subset of memory cells of the memory device. Generally, writing data to such memory devices involves programming (by way of a program operation) the memory devices at the page level of a block, and erasing data from such memory devices involves erasing the memory devices at the block level (e.g., page level erasure of data is not possible).

A memory device can comprise one or more cache blocks and one or more non-cache blocks, where data written to the memory device is first written to one or more cache blocks, which can facilitate faster write performance; and data stored on the cache blocks can eventually be moved (e.g., copied) to one or more non-cache blocks at another time (e.g., a time when the memory device is idle), which can facilitate higher storage capacity on the memory device. A cache block can comprise a single-level cell (SLC) block that comprises multiple SLCs, and a non-cache block can comprise a multiple-layer cell (MLC) block that comprises multiple MLCs, a triple-level cell (TLC) block that comprises multiple TLCs, or a quad-level cell (QLC) block that comprises QLCs. Writing first to one or more SLCs blocks can be referred to as SLC write caching or SLC caching (also referred to as buffering in SLC mode). Generally, when using traditional full SLC caching, an SLC block is released of data after data is moved from the SLC block to a non-cache block (e.g., QLC block) and the non-cache block is verified to be free of errors.

A compaction (or a garbage collection) operation can be performed with respect to a cache block (containing one or more memory cells) of a memory device (e.g., NAND-type memory device), where the data stored in the cache block is copied (e.g., transferred) to a non-cache block. A compaction operation can be performed with respect to a set of cache blocks when, for instance, there are no available cache blocks to cache new data (e.g., cache new written data). As used herein, a block compaction operation is performed on a cache block and can comprise reading data stored on the cache block and writing the read data to a non-cache block (e.g., programming the non-cache block with the data read from the cache block), thereby copying the data from the cache block to the non-cache block An example block compaction operation can include a SLC-QLC block compaction operation. A block compaction operation can be performed, for instance, when available cache blocks on a memory device are full or nearing a fill limit.

For conventional memory devices that comprise NOT-AND (NAND) memory cells (hereafter referred to as NAND-type memory devices), writing and erasing sequentially generally leads to lower or reduced write amplification (e.g., a low write amplification factor (WAF)) and better data performance. While modern software on host systems (e.g., software applications, databases, and file systems) tend to read and write data sequentially with respect to a memory system (e.g., a memory sub-system coupled to a host system), when such software is executed by one or more multicore hardware processors of the host system, the sequentiality of data access request (e.g., read and write requests) to the memory system is usually lost. For instance, when modern software operates on one or more multicore hardware processors of a host system, a block layer of the host system typically divides work to be performed by each process (of the software) among two or more cores of a multicore hardware processor (e.g., in a way where work is uniformly divided across cores to achieve maximum throughput). While each core of a host system's hardware processor may still issue largely sequential data access requests to a memory system, the data access requests are usually intermingled (e.g., interleaved) with each other and appear random or pseudo-random from the perspective of the memory system. This can be due to data aggregation and request priority policy in a data link layer between the host system and the memory system. For instance, a memory system having a Non-Volatile Memory Express (NVMe) architecture is typically designed to have an out-of-order traffic handshake between the host system and a controller of the memory system for data performance reasons.

The architecture of conventional memory systems, such as those implemented by a NVMe standard, include multiple queues for processing data access requests (e.g., read and write requests) from host systems. For instance, a memory system based on a NVMe standard can comprise multiple pairs of queues, where each queue pair is associated with a different queue identifier (QID), and where each queue pair comprises a submission queue for incoming requests that need to be completed/processed and a completion queue for command requests already completed/processed by the memory system. As herein, a submission queue identifier (SQID) can refer to a submission queue of a given queue pair, and can be equal to the QID of the given queue pair. A QID can be included as a parameter (e.g., QID tag) in a data access request from a host system to a memory system, and can serve as a pointer to a submission queue on the memory system that is to receive the data access request. Generally, each core of a host system's hardware processor is individually associated with (e.g., assigned to, mapped to, attached to) a different QID (e.g., different queue pair on the memory system having a unique QID), and data access requests (e.g., read and write requests) from a given core are received and stored by a submission queue that has a queue identifier associated with the given core. Additionally, a given thread executing on a host system (e.g., of a software application or a database on the host system) tends to be started/run on the same core of the host system's hardware processor (e.g., threads on the host system tend to have core affinity). A given core of a host system's hardware processor can have multiple threads (e.g., four to five threads) that operate on and have affinity to the given core.

In conventional memory systems, a read-ahead operation (or process) can be performed to improve memory access latency, optimize data retrieval, or both. Typically, performing a read-ahead operation on a memory system involves a memory system fetching (or pre-fetching) data from one of its memory devices before it is explicitly requested by the host system (e.g., a hardware processor of the host system or a software application running on the host system). Specifically, a read-ahead operation (also referred to as a read look-ahead operation) can take advantage of spatial locality of stored data on a memory device and that a host system (e.g., a software application running thereon) has a tendency of accessing data from contiguous memory locations. The memory system can predict that once a specific memory location on a memory device is accessed (or a sequence of specific memory locations on the memory device are accessed) at the request (e.g., read request) of a host system, the host system will likely explicitly request access of data from one or more subsequent memory locations on the memory device in a sequential manner. Based on this prediction, the memory system can initiate a read-ahead operation to fetch (or pre-fetch) the data from the subsequent memory locations into a cache, buffer, or some other temporary data storage area. Subsequently, when the host system explicitly requests the fetched/pre-fetched data from the memory system (e.g., via an explicit read request), the memory system already has the requested data available in the cache or buffer, resulting in faster read access times. In this way, a read-ahead operation can reduce or help reduce read access latency.

Generally, there is little opportunity for a conventional memory system to perform read-ahead operations when a host system is configured to detect read-ahead opportunities on the host-side and coalesce such opportunities into individual read requests that it sends to the memory system. Nevertheless, conventional block input/output (I/O) drivers on a host system usually break down an individual read request (submitted by the host system) into a sequence of smaller read requests when a read size of the individual read request reaches or surpasses a maximum data transfer size (MDTS) of the memory system, where each smaller read requests has a read size that is equal to or less than the MDTS, and where the sequence is usually sent to (e.g., submitted to and received by) the memory system as a contiguous sequence. For instance, where a memory system has a MDTS of 512 KB and a host system generates a single read request having a read size of 3 MB, the block I/O driver of the host system can divide the single read request into a sequence of five smaller read requests having a read size of 512 KB and a sixth read request having a read size of 410 bytes, which represents the remainder of the 3 MB. Memory system of various embodiments described herein are configured to detect and use opportunities for performing read-ahead operations based on this behavior by host-side block I/O drivers.

Aspects of the present disclosure are directed to performing one or more data read-ahead operations on a memory system (e.g., the memory sub-system) based on a read size and a queue identifier of a read request. In particular, a memory system of some embodiments is configured to perform at least one read-ahead operation when an individual read request, received from a host system in association with a queue identifier, has a read size equal to the MDTS of the memory system. Additionally, a memory system of some embodiments continues to perform one or more subsequent read-ahead operations as long as subsequent requests received from the host system in association with the queue identifier have a read size equal to MDTS and specify a subsequent memory location (e.g., subsequent LBA) relative to the last request received from the host system in association with the queue identifier.

For instance, if a memory system receives a first read request from a host system that is associated with QID #21, that has a read size of MDTS (e.g., 512 KB), and that specifies a first memory location (e.g., LBA100) on a memory device of the memory system, the memory system can perform a read-ahead operation on a second memory location (e.g., LBA101) on the memory device that follows after the first memory location. Thereafter, if the memory system receives a second read request from the host system that is associated with QID #21, that follows the first read request (e.g., in the submission queue is associated with [e.g., corresponding to] QID #21), that has a read size of MDTS (e.g., 512 KB), and that specifies a memory location that follows the first memory location (i.e., the second memory location), the memory system can perform read-ahead operation on a third memory location (e.g., LBA102) on the memory device that follows after the second memory location. This consecutive performance of read-ahead operations can continue until a sequence (e.g., contiguous sequence) of read requests to consecutive memory locations on the memory device, having MDTS read size, stops flowing from the submission queue is associated with QID #21 (e.g., until the contiguous sequence of read requests ends). For instance, the performance of consecutive read-ahead operations can end when: (a) a write request is retrieved from the submission queue is associated with QID #21; (b) a read request having a non-consecutive memory location is retrieved from the submission queue associated with QID #21; or (c) a read request having a read size less than MDTS is retrieved from the submission queue associated with QID #21.

Though various embodiments are described herein with respect to comparing a read size against a MDTS of a memory system, it will be appreciated that for alternative embodiments, a reference read transfer size can be used in place of the MDTS of the memory system, where the reference read transfer size can be set to a value that is different from MDTS (e.g., smaller than or larger than MDTS). Depending on the embodiment, the reference read transfer size can comprise a value that is set or updated by a user of the memory system or by a process (e.g., one configured to dynamically adjust the value based on one or more conditions).

Overall, the use of various embodiments described herein can result in benefits common to using read-ahead operations, such as reduced read latency on memory systems, optimized data retrieval, and the like.

Data access request and command request are used interchangeably herein. As used herein, a data access request/command request can comprise a data access command for a memory system. Accordingly, a write request can comprise a write command for a memory system, and a read request can comprise a read command for a memory system.

As used herein, a superblock of a memory device (e.g., of a memory system) comprises a plurality (e.g., collection or grouping) of blocks of the memory device. For example, a superblock of a NAND-type memory device can comprise a plurality of blocks that share a same position in each plane in each NAND-type memory die of the NAND-type memory device.

Disclosed herein are some examples of performing one or more data read-ahead operations on a memory system (e.g., the memory sub-system) based on a read size and a queue identifier of a read request, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, USB interface, Fibre Channel, Serial Attached SCSI (SAS), Small Computer System Interface (SCSI), a double data rate (DDR) memory bus, a DIMM interface (e.g., DIMM socket interface that supports DDR), Open NAND Flash Interface (ONFI), DDR, Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple or fractional bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands, requests, or operations from the host system 120 and can convert the commands, requests, or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

Each of the memory devices 130, 140 include a memory die 150, 160. For some embodiments, each of the memory devices 130, 140 represents a memory device that comprises a printed circuit board, upon which its respective memory die 150, 160 is solder mounted.

The memory sub-system controller 115 includes a read size and queue identifier-based read-ahead unit 113 (hereafter, the read-ahead unit 113) that enables or facilitates the memory sub-system controller 115 to perform one or more data read-ahead operations on the memory sub-system 110 as described herein. For some embodiments, the read-ahead unit 113 can be part of a larger queue identifier-based request processor (not shown). Alternatively, some or all of the read-ahead unit 113 is included by the local media controller 135, thereby enabling the local media controller 135 to enable or facilitate performance of one or more data read-ahead operations on the memory sub-system 110 as described herein.

Figure 2:
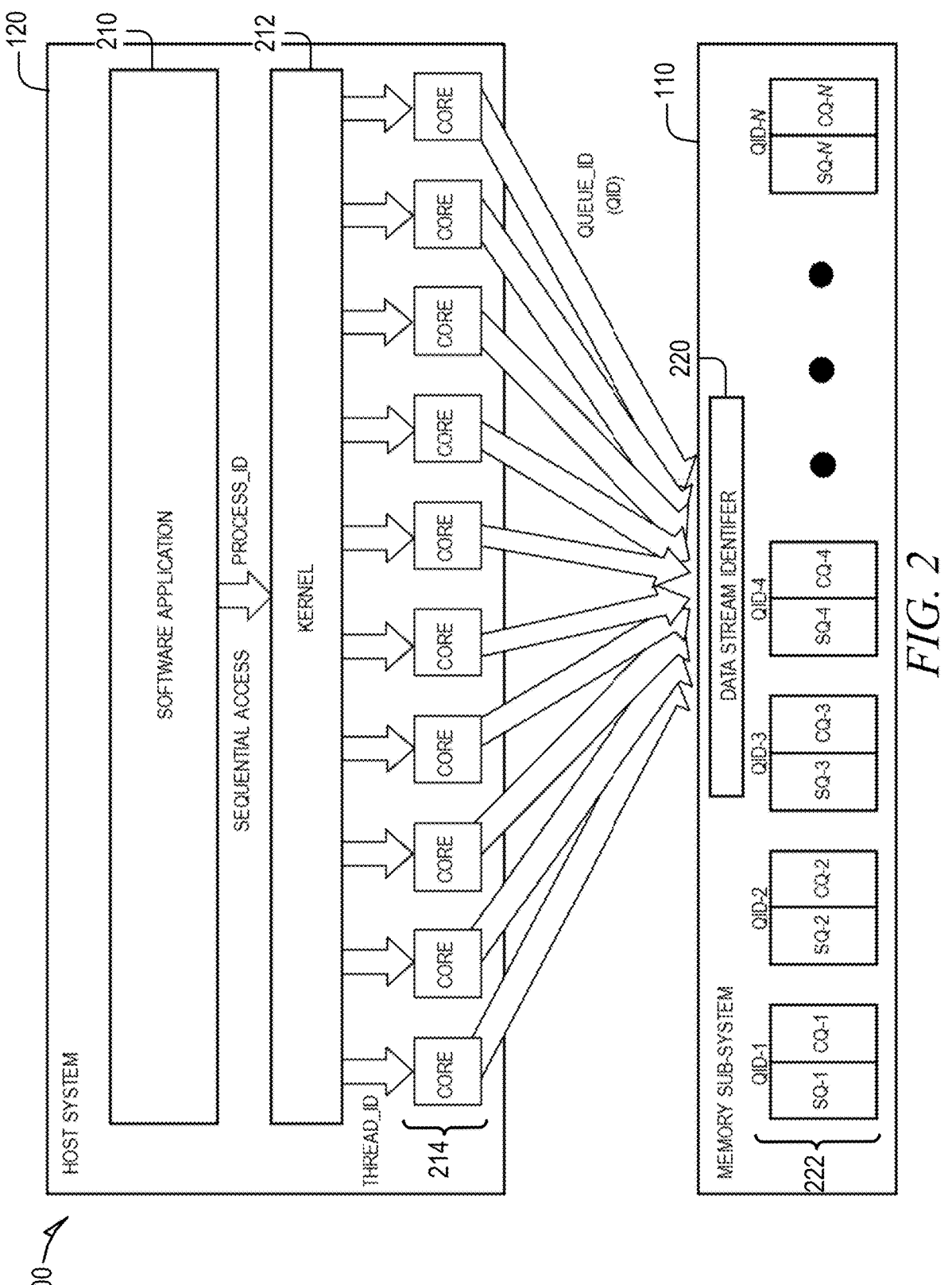
FIG. 2 is a diagram illustrating an example architecture of a host system and a memory sub-system, in accordance with some embodiments of the present disclosure.

FIG. 2 is a diagram illustrating an example architecture 200 of the host system 120 and the memory sub-system 110 of FIG. 1, in accordance with some embodiments of the present disclosure. In the example architecture 200, the host system 120 comprises multiple hardware processor cores 214, a software application 210 operating on the multiple hardware processor cores 214, and a kernel 212 (e.g., of an operating system) operating on the multiple hardware processor cores 214. Additionally, in the example architecture 200, the memory sub-system 110 comprises a data stream identifier 220 (e.g., part of a queue identifier-based request processor) and multiple pairs of queues 222, which include queues pairs associated with queue identifier-1 (QID-1) through queue identifier-N (QID-N). The queue pair associated with queue identifier-1 (QID-1) comprises a submission queue 1 (SQ-1) and a completion queue (CQ-1), the queue pair associated with queue identifier-2 (QID-2) comprises a submission queue-2 (SQ-2) and a completion queue (CQ-2), the queue pair associated with queue identifier-3 (QID-3) comprises a submission queue-3 (SQ-3) and a completion queue (CQ-3), the queue pair associated with queue identifier-4 (QID-4) comprises a submission queue-4 (SQ-4) and a completion queue (CQ-4), and so on. During operation, the software application 210 can cause execution of processes (having process identifiers (PROCESS_IDs)) by the kernel 212, where one or more of the processes can involve generation of sequential data access requests. The kernel 212 can execute at least one of the processes by dividing the process into multiple threads (each having a thread identifier (THREAD_ID)) to be executed by the multiple hardware processor cores 214. Each of the threads can be assigned for execution by one of the multiple hardware processor cores 214 (e.g., according to core affinity), and execution of a thread by a given hardware processor core can cause the given hardware processor core to generate and issue one or more data access requests to the memory sub-system 110, where each generated/issued data access request includes a queue identifier (QID) of the given hardware processor core.

As data access requests are generated and issued by the multiple hardware processor cores 214, the data access requests from each hardware processor core can be interleaved with those generated and issued by one or more other hardware processor cores. Accordingly, the data access request received by the memory sub-system 110 can appear random or pseudo-random to the memory sub-system 110.

Upon receiving a given data access request, the memory sub-system 110 can use the data stream identifier 220 to determine a given queue identifier of the given data access request, and the memory sub-system 110 can cause the given data access request to be stored in a submission queue (e.g., stored to an entry added to the submission queue) of the queue pair (of the multiple pairs of queues 222) that corresponds to (e.g., matches) the given queue identifier. When the given data access request has been processed (e.g., executed) by the memory sub-system 110, the results of the given data access request can be stored (e.g., queued) to a completion queue (e.g., stored to an entry added to the completion queue) of the queue pair (of the multiple pairs of queues 222) that corresponds to (e.g., matches) the given queue identifier, from which the host system 120 can obtain (e.g., collect) the results.

Figure 3:
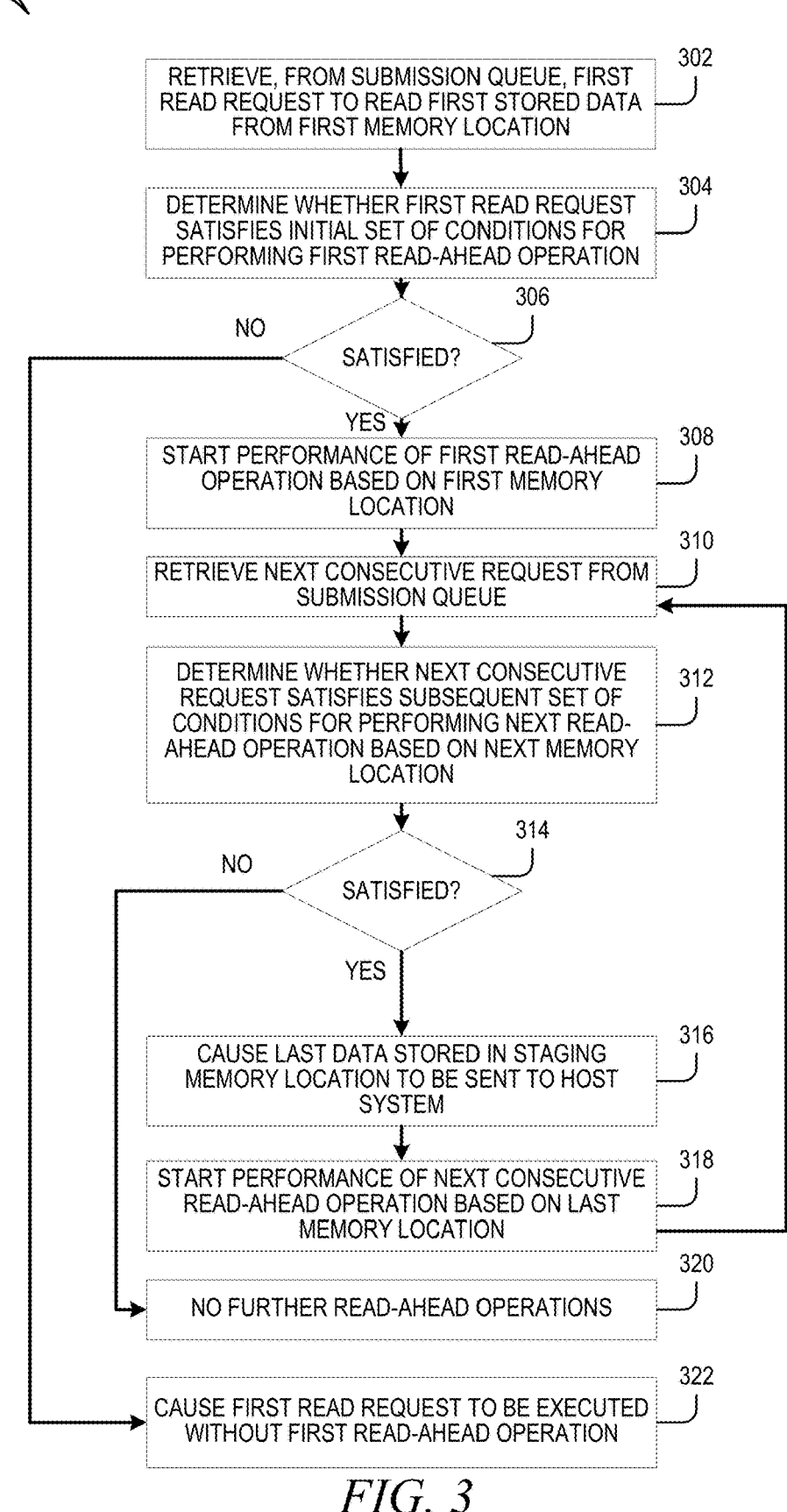
Figure 4B:
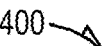
Figure 4B:
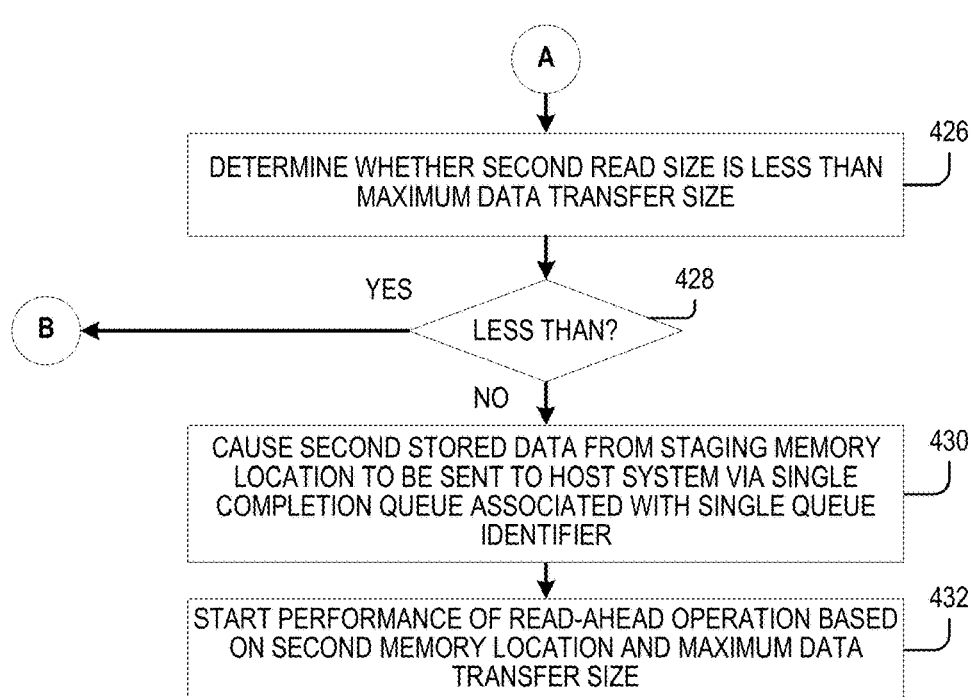

FIGS. 3, 4A, and 4B are flow diagrams of example methods 300, 400 for performing one or more data read-ahead operations on a memory system, in accordance with some embodiments of the present disclosure. Any of methods 300, 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of methods 300, 400 is performed by the memory sub-system controller 115 of FIG. 1 based on the read-ahead unit 113. Additionally, or alternatively, for some embodiments, at least one of the methods 300, 400 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 300 of FIG. 3, at operation 302, a processing device (e.g., the processor 117 of the memory sub-system controller 115) retrieve, from an individual submission queue (e.g., of an individual queue pair) associated with an individual queue identifier (e.g., QID #5), a first read request to read first stored data starting from a first memory location on the memory system (e.g., on the memory device 130 of the memory sub-system 110). Then, at operation 304, the processing device (e.g., the processor 117) determines whether the first read request satisfies an initial set of conditions for performing a first read-ahead operation based on the first memory location. For some embodiments, the initial set of conditions comprises that the first read request has a read size that is not less than MDTS of the memory system (e.g., read size that is equal to the MDTS, or the read size that is greater than MDTS).

At decision point 306, if the processing device (e.g., the processor 117) determines that the initial set of conditions is not satisfied, the method 300 proceeds to operation 322, where the processing device causes the first read request to be executed without performing or starting performance of a (first) read-ahead operation. For instance, execution of the first read request can cause first stored data to be read starting from the first memory location, where the amount of data read is specified by the first read size of the first read request. However, if at decision point 306 the processing device (e.g., the processor 117) determines that the initial set of conditions is satisfied, the method 300 proceeds to operation 308.

During operation 308, the processing device (e.g., the processor 117) starts (e.g., invokes) performance of a first read-ahead operation based on the first memory location. According to some embodiments, the first read-ahead operation based on the first memory location comprises reading (e.g., fetching) second stored data starting from a second memory location, where a MDTS amount of data is read from starting from the second memory location, and where the second memory location consecutively follows the first memory location after a MDTS amount of data (e.g., the second memory location is the next memory location that follows the end of the first stored data). For various embodiments, the first read-ahead operation causes the second stored data that is read from the second memory location to be stored in a staging memory location (e.g., parking or parked memory location) on the memory system (e.g., on the local memory 119), where the staging memory location associated with (e.g., indexed by) the individual queue identifier of the first read request (e.g., QID #5). The staging memory location associated with the individual queue identifier can function as temporary data storage for the second stored data read by the first read-ahead operation. By storing the second stored data at the staging memory location associated with the individual queue identifier, the memory system can stage (e.g., park) the second stored data prior to sending it (e.g., passing it) to the host system (e.g., prior to sending the second stored data to the host system 120 by way of a completion queue associated with the individual queue identifier (e.g., QID #5)).

After starting performance of the first read-ahead operation, at operation 310, the processing device (e.g., the processor 117) retrieves a next consecutive request from the individual submission queue of the memory system (e.g., the memory sub-system 110). For operation 312, the processing device determines whether the next consecutive request (retrieved from the individual submission queue) satisfies a subsequent set of conditions for performing a next read-ahead operation based on a next memory location (e.g., the second memory location). For some embodiments, the subsequent set of conditions comprises that: the next request is a read request having a read size that is not less than MDTS of the memory system (e.g., read size that is equal to the MDTS, or the read size that is greater than MDTS) and that request the memory system to read data from the next memory location (e.g., the second memory location); and the next request specifies the next memory location (e.g., specifies the second memory location).

At decision point 314, if the processing device (e.g., the processor 117) determines that the subsequent set of conditions is not satisfied, the method 300 proceeds to operation 320, where the processing device does not start (e.g., invoke) performance of any additional read-ahead operations. However, if at decision point 314 the processing device (e.g., the processor 117) determines that the subsequent set of conditions is satisfied, the method 300 proceeds to operation 316.

At operation 316, the processing device (e.g., the processor 117) causes last data stored in a staging memory location (by the read-ahead operation last performed in connection with the same individual queue identifier, hereafter last-performed read-ahead operation) associated with the individual queue identifier (e.g., QID #5) to be sent the host system (e.g., 120) via a completion queue associated with the individual queue identifier. For instance, the processing device can cause the last data to be sent to the host system by submitting the last data to (e.g., by copying the last data into a new entry submitted to) the completion queue associated with the individual queue identifier.

Thereafter, at operation 318, the processing device (e.g., the processor 117) starts (e.g., invokes) performance of a next consecutive read-ahead operation based on a last memory location read (e.g., the last memory location read by the last read-ahead operation performed). In doing so, the memory system can continue the consecutive sequence of read-ahead operations being performed for consecutive read requests received by the memory system in association with the individual queue identifier (e.g., QID #5). For various embodiments, performing a read-ahead operation based on a last memory location read comprises reading stored data from a next memory location that follows the last memory location after a MDTS amount of data. For example, if the last memory location read from by the read-ahead operation (last-performed read-ahead operation for the individual queue identifier) corresponds to memory address LBA200 and a MDTS amount of data corresponds to a single block of data, the next memory location can correspond to LBA201. According to some embodiments, the next consecutive read-ahead operation based on the last memory location read (e.g., LBA200) comprises reading (e.g., fetching) next stored data starting from the next memory location (e.g., LBA201), where a MDTS amount of data is read from starting from the next memory location, and where the next memory location consecutively follows the last memory location after a MDTS amount of data. For various embodiments, the next consecutive read-ahead operation causes the next stored data that is read from the next memory location to be stored in the staging memory location (e.g., parking or parked memory location) on the memory system (e.g., on the local memory 119), where the memory location associated with (e.g., indexed by) the individual queue identifier of the first read request (e.g., QID #5). As noted, the staging memory location associated with the individual queue identifier can function as temporary data storage for the next stored data read by the next consecutive read-ahead operation.

After operation 318, the method 300 returns to operation 310, where the processing device (e.g., the processor 117) repeats the method 300 with respect to a next request from the submission queue associated with the individual queue identifier (e.g., QID #5), thereby possibly continuing the sequence of read-ahead operations being performed.

Referring now to the method 400 of FIGS. 4A and 4B, the method 400 illustrates another example method for performing one or more data read-ahead operations on a memory system and, more specifically, represents an example implementation of the method 300 of FIG. 3. At operation 402, a processing device (e.g., the processor 117 of the memory sub-system controller 115) receives a set of command requests from the host system. For various embodiments, each individual command request in the set of command requests includes an individual queue identifier (e.g., includes a QID tag), where the individual command request is stored to an individual submission queue of an individual queue pair of the memory system, and where the individual queue pair is associated with (e.g., corresponds to) the individual queue identifier of the individual command request. Thereafter, at operation 404, the processing device retrieves, from a single submission queue of a single queue pair of a plurality of queue pairs of a memory system, a first read request (e.g., single read request) to read data from a specified memory location on the memory device, where the single queue pair is associated with (e.g., corresponds to) a single queue identifier of the first read request.

At operation 406, the processing device (e.g., the processor 117) determines a first read size (e.g., single read size) of the first read request, where the first read size specifies an amount of data to be read from the specified memory location. Thereafter, at operation 408, the processing device (e.g., the processor 117) determines whether the first read size is less than a maximum data transfer size (MDTS) of the memory sub-system. At decision point 410, if the processing device determines that the first read size is less than the MDTS (e.g., the first read size is not equal to MDTS), the method 400 proceeds to operation 412, where the processing device causes the first read request to be executed without performing or starting performance of the read-ahead operation. For various embodiments, execution of the first read request causes the stored data to be read from the memory device starting from the specified memory location, and causes that stored data to be sent (e.g., without staging) to the host system (e.g., 120) via an individual completion queue of the single queue pair (associated with the individual queue identifier). If however, at decision point 410, the processing device determines that the first read size is not less than the MDTS (e.g., the first read size is equal to or greater than MDTS), the method 400 proceeds to operation 414.

During operation 414, the processing device (e.g., the processor 117) causes the first read request to be executed, where execution of the first read request causes the stored data to be read from the memory device starting from the specified memory location, and causes that stored data to be sent (e.g., without staging) to the host system (e.g., 120) via an individual completion queue of the single queue pair (associated with the individual queue identifier). Thereafter, operation 416, the processing device performs or starts performance of a (first) read-ahead operation based on the specified memory location and the MDTS. For some embodiments, performance of the (first) read-ahead operation based on the specified memory location and the MDTS comprises causing second stored data (of the MDTS) to be read starting from a second memory location on the memory system, where the second memory location is a next memory location that follows the first memory location after a MDTS amount of data. Additionally, for some embodiments, performance of the (first) read-ahead operation based on the specified memory location and the MDTS comprises causing the second stored data (read from the next memory location) to be stored to a staging memory location associated with the single queue identifier.

The method 400 proceeds to operation 418, where the processing device (e.g., the processor 117) retrieves, from the single submission queue, a next consecutive request that follows the first read request. The next consecutive request can comprise a read request or a write request. At operation 420, the processing device (e.g., the processor 117) determines whether the next consecutive request is a second read request to read data from the memory device starting from the second memory location.

At decision point 422, if the processing device (e.g., the processor 117) determines that the next consecutive request is a second read request to read data starting from the second memory location, the method 400 proceeds to operations 424. If however, at decision point 422, the processing device determines that the next consecutive request is not the second read request (e.g., the next consecutive request is a write request or a read request to read from another memory location), the method 400 returns to operation 412, where the processing device causes the next consecutive request to be executed without performing or starting performance of the read-ahead operation again. Alternatively, if the processing device determines that the next consecutive request is not the second read request, the processing device causes the second stored data in the staging memory location to be sent to the host system, via the single completion queue of the single queue pair, without performing or starting performance of the read-ahead operation again.

At operation 424, the processing device (e.g., the processor 117) determines a second read size of the second read request and, at operation 426, the processing device determines whether the second read size is less than the MDTS. Subsequently, at decision point 428, if the processing device determines that the second read size is less than the MDTS, the method 400 proceeds to operation 412, where the processing device causes the second read request to be executed without performing or starting performance of the read-ahead operation again. Alternatively, if the processing device determines that the second read size is less than the MDTS, the processing device causes the second stored data in the staging memory location to be sent to the host system, via the single completion queue of the single queue pair, without performing or starting performance of the read-ahead operation again. If however, at decision point 428, the processing device determines that the second read size is not less than the MDTS (e.g., is equal to or greater than the MDTS), the method 400 proceeds to operation 430, where the processing device causes the second stored data in the staging memory location to be sent to the host system via a single completion queue of the single queue pair. For example, this can involve the processing device copying the second stored data into a new entry submitted to the completion queue associated with the individual queue identifier.

After operation 430, the method 400 proceeds to operation 432, where the processing device (e.g., the processor 117) performs or starts performance of a second read-ahead operation based on the second memory location and the MDTS. For various embodiments, performance of the second read-ahead operation based on the second memory location and the MDTS comprises causing third stored data (of the MDTS) to be read starting from a third memory location on the memory system, where the third memory location is a next memory location that follows the second memory location after a MDTS amount of data.

Figure 5:
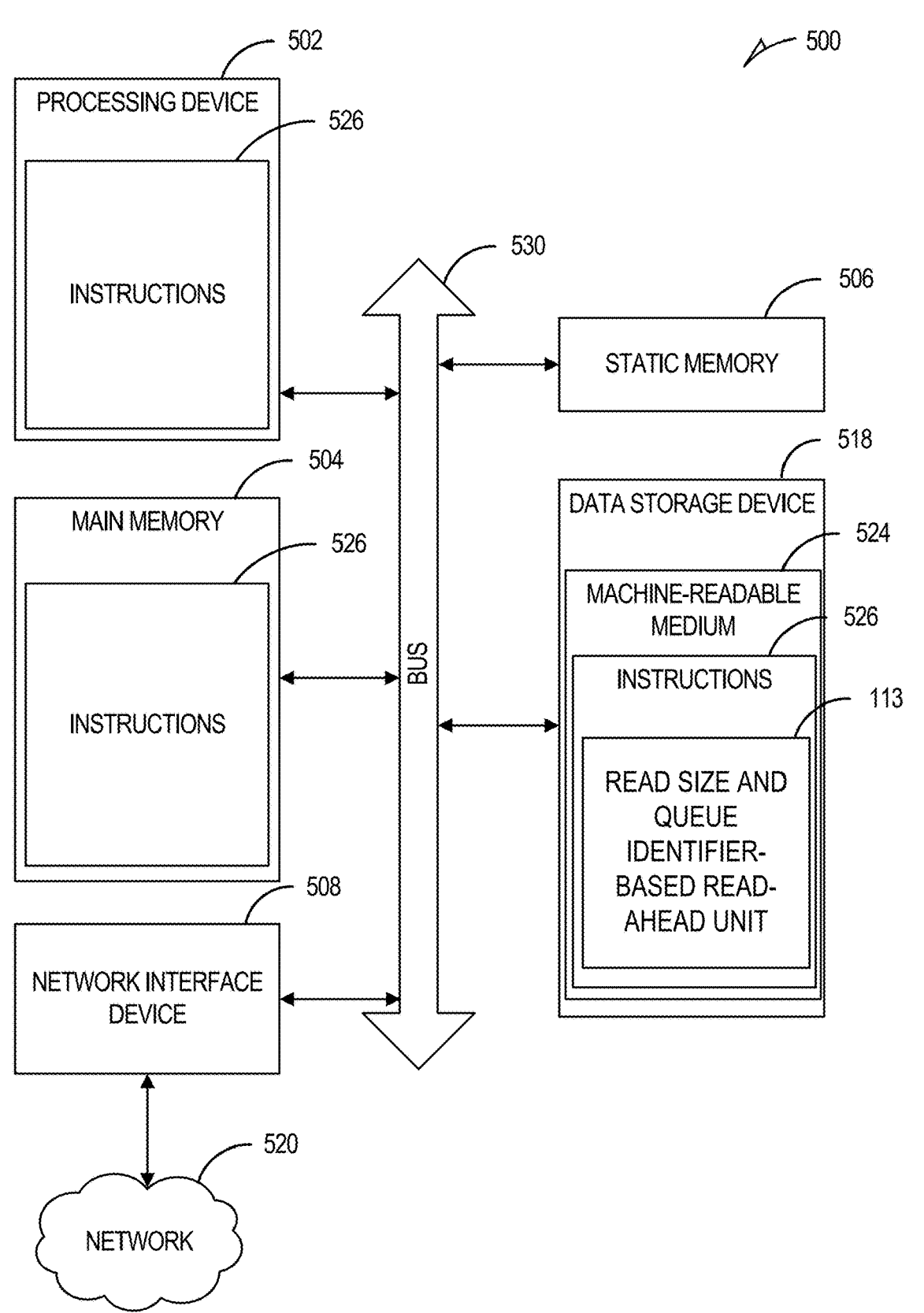
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or Rambus DRAM (RDRAM), etc.), a static memory 506 (e.g., flash memory, static random access memory (SRAM), etc.), and a data storage device 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application-specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage device 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage device 518, and/or main memory 504 can correspond to the memory sub-system 110 of FIG. 1.

In one embodiment, the instructions 526 include instructions to implement functionality corresponding to performing one or more data read-ahead operations on the memory sub-system 110 as described herein (e.g., the read-ahead unit 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMS, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (e.g., non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of queues;
a memory device; and
a processing device, operatively coupled to the memory device, configured to perform operations comprising:
    retrieving, from a submission queue of the plurality of queues, a first read request to read data from a first memory location on the memory device, the submission queue being associated with a queue identifier;
    determining a first read size of the first read request, the first read size specifying an amount of data to be read from the first memory location;
    determining whether the first read size is less than a maximum data transfer size; and
    in response to determining that the first read size is not less than the maximum data transfer size:
        causing the first read request to be executed, execution of the first read request causing first stored data of the maximum data transfer size to be read from the memory device starting from the first memory location;
        starting performance of a read-ahead operation based on the first memory location and the maximum data transfer size, the performance of the read-ahead operation based on the first memory location and the maximum data transfer size comprising causing second stored data of the maximum data transfer size to be read from the memory device starting from a second memory location on the memory device and to be stored to a staging memory location associated with the queue identifier, the second memory location being a next memory location that follows the first memory location after a maximum data transfer size amount of data;
    retrieving, from the submission queue, a next consecutive request that follows the first read request;

determining whether the next consecutive request is a second read request to read data from the memory device starting from the second memory location; and
        in response to determining that the next consecutive request is the second read request to read data starting from the second memory location:
            determining a second read size of the second read request;
            determining whether the second read size is less than the maximum data transfer size; and
            in response to determining that the second read size is not less than the maximum data transfer size:
                causing the second stored data in the staging memory location to be sent to a host system via a completion queue of the plurality of queues, the completion queue being associated with the queue identifier; and
                starting performance of the read-ahead operation based on the second memory location and the maximum data transfer size.

2. The system of claim 1, wherein the operations comprise:
in response to determining that the first read size is less than the maximum data transfer size, causing the first read request to be executed without starting the performance of the read-ahead operation, execution of the first read request causing the first stored data to be read from the memory device starting from the first memory location and to be sent to a host system via a completion queue of the plurality of queues, the completion queue being associated with the queue identifier.

3. The system of claim 1, wherein the operations comprise:
in response to determining that the next consecutive request is not the second read request to read data starting from the second memory location, causing the next consecutive request to be executed without starting the performance of the read-ahead operation.

4. The system of claim 1, wherein the operations comprise:
in response to determining that the second read size is less than the maximum data transfer size, causing the second read request to be executed without starting the performance of the read-ahead operation, execution of the second read request causing stored data of the second read size to be read from the memory device starting from the second memory location.

5. The system of claim 1, wherein the operations comprise:
in response to determining that the second read size is less than the maximum data transfer size, causing the second stored data in the staging memory location to be sent to the host system without starting the performance of the read-ahead operation, the second stored data being sent to the host system via a completion queue of the plurality of queues, the completion queue being associated with the queue identifier.

6. The system of claim 1, wherein the performance of the read-ahead operation based on the second memory location and the maximum data transfer size comprises:
causing third stored data of the maximum data transfer size to be read from the memory device starting from a third memory location on the memory device, the third memory location being a next memory location that follows the second memory location after a maximum data transfer size amount of data.

7. The system of claim 6, wherein the performance of the read-ahead operation based on the second memory location and the maximum data transfer size comprises:

causing the third stored data read from the memory device to be stored to the staging memory location associated with the queue identifier.

8. The system of claim 1, wherein the submission queue is a select submission queue, and wherein the operations comprise:

receiving a set of command requests from a host system, each individual command request in the set of command requests including an individual queue identifier, the individual command request being stored to an individual submission queue of the plurality of queues associated with the individual queue identifier.

9. The system of claim 1, wherein a block input/output driver of a host system is configured to divide up a large read request having a large read size over the maximum data transfer size to a plurality of read requests each having an individual read size that is either less than or equal to the maximum data transfer size.

10. At least one non-transitory machine-readable storage medium comprising instructions that, when executed by a processing device of a memory sub-system, cause the processing device to perform operations comprising:

retrieving, from a submission queue of the memory sub-system, a first read request to read data from a first memory location on a memory device of the memory sub-system, the submission queue being associated with a queue identifier;

determining a first read size of the first read request, the first read size specifying an amount of data to be read from the first memory location;

determining whether the first read size is less than a maximum data transfer size; and in response to determining that the first read size is not less than the maximum data transfer size;

causing the first read request to be executed, execution of the first read request causing first stored data of the maximum data transfer size to be read from the memory device starting from the first memory location;

starting performance of a read-ahead operation based on the first memory location and the maximum data transfer size, the performance of the read-ahead operation based on the first memory location and the maximum data transfer size comprising causing second stored data of the maximum data transfer size to be read from the memory device starting from a second memory location on the memory device and to be stored to a staging memory location associated with the queue identifier, the second memory location being a next memory location that follows the first memory location after a maximum data transfer size amount of data;

retrieving, from the submission queue, a next consecutive request that follows the first read request;

determining whether the next consecutive request is a second read request to read data from the memory device starting from the second memory location; and in response to determining that the next consecutive request is the second read request to read data starting from the second memory location:

determining a second read size of the second read request;

determining whether the second read size is less than the maximum data transfer size; and in response to determining that the second read size is not less than the maximum data transfer size:

causing the second stored data in the staging memory location to be sent to a host system via a completion queue of the memory sub-system, the completion queue being associated with the queue identifier; and starting performance of the read-ahead operation based on the second memory location and the maximum data transfer size.

11. The at least one non-transitory machine-readable storage medium of claim 10, wherein the operations comprise:

in response to determining that the first read size is less than the maximum data transfer size, causing the first read request to be executed without starting the performance of the read-ahead operation, execution of the first read request causing the first stored data to be read from the memory device starting from the first memory location and to be sent to a host system via a completion queue of the memory sub-system, the completion queue being associated with the queue identifier.

12. The at least one non-transitory machine-readable storage medium of claim 10, wherein the operations comprise:

in response to determining that the next consecutive request is not the second read request to read data starting from the second memory location, causing the next consecutive request to be executed without starting the performance of the read-ahead operation.

13. The at least one non-transitory machine-readable storage medium of claim 10, wherein the operations comprise:

in response to determining that the second read size is less than the maximum data transfer size, causing the second stored data in the staging memory location to be sent to the host system without starting the performance of the read-ahead operation, the second stored data being sent to the host system via a completion queue of the memory sub-system, the completion queue being associated with the queue identifier.

14. A method comprising:

retrieving, by a processing device of a memory sub-system and from a submission queue of the memory sub-system, a first read request to read data from a first memory location on the memory sub-system, the submission queue being associated with a queue identifier;

determining, by the processing device, whether the first read request satisfies an initial set of conditions for performing a first read-ahead operation; and in response to determining that the first read request satisfies the initial set of conditions:

starting, by the processing device, performance of the first read-ahead operation based on the first memory location; and repeating operations that comprise:

retrieving, by the processing device, a next consecutive request from the submission queue;

determining, by the processing device, whether the next consecutive request satisfies a subsequent set of conditions for performing a next consecutive read-ahead operation;

in response to determining that the next consecutive request satisfies the subsequent set of conditions;

causing stored data in a staging memory location associated with the queue identifier to be sent to a host system via a completion queue of the memory sub-system; and starting, by the processing device, performance of the next consecutive read-ahead operation based on a last memory location read by a last-performed read-ahead operation; and in response to determining that the next consecutive request does not satisfy the subsequent set of conditions, ending the repeating of the operations.

15. The method of claim 14, wherein the submission queue is a select submission queue, and wherein the method comprises:

receiving a set of command requests from a host system, each individual command request comprising an individual queue identifier, and the individual command request being stored to an individual submission queue associated with the individual queue identifier.

16. The method of claim 14, wherein a block input/output driver of a host system is configured to divide a large read request having a read size greater than a maximum data transfer size into a plurality of read requests, each having an individual read size that is less than or equal to the maximum data transfer size.

17. The method of claim 14, wherein the performance of the next consecutive read-ahead operation comprises:

causing the stored data read from the memory sub-system to be stored in the staging memory location associated with the queue identifier.

* * * * *